(12) United States Patent
Kawashima et al.

(10) Patent No.: US 7,360,454 B2
(45) Date of Patent: Apr. 22, 2008

(54) FLOWMETER HAVING A FLOAT AND A DISPLACEMENT SENSOR

(75) Inventors: Hiroyasu Kawashima, Tokyo (JP); Hiroaki Ogamino, Tokyo (JP); Katsuaki Usui, Tokyo (JP); Toshiharu Nakazawa, Tokyo (JP)

(73) Assignee: Ebara Corporation, Tokyo (JP)

( * ) Notice: Subject to any disclaimer, the term of this patent is extended or adjusted under 35 U.S.C. 154(b) by 48 days.

(21) Appl. No.: 11/418,142

(22) Filed: May 5, 2006

(65) Prior Publication Data
US 2006/0254368 A1  Nov. 16, 2006

(30) Foreign Application Priority Data
May 11, 2005  (JP) .............................. 2005-138321

(51) Int. Cl.
*G01F 1/22* (2006.01)
(52) U.S. Cl. .................................................. 73/861.57
(58) Field of Classification Search ............ 73/861.57
See application file for complete search history.

(56) References Cited

U.S. PATENT DOCUMENTS

| 2,411,330 | A | * | 11/1946 | Melas et al. ............. 73/861.56 |
| 2,452,156 | A | * | 10/1948 | Schover .................. 340/870.31 |
| 4,523,480 | A | * | 6/1985 | Inoue ....................... 73/861.56 |
| 4,862,898 | A | * | 9/1989 | Hudimac, Jr. ............... 600/538 |
| 5,079,961 | A | * | 1/1992 | Lew ......................... 73/861.56 |
| 6,591,694 | B2 | * | 7/2003 | Tsai et al. ................. 73/861.57 |
| 6,889,563 | B2 | * | 5/2005 | Tomita et al. ........... 73/861.57 |
| 6,901,813 | B2 | * | 6/2005 | Riegel ..................... 73/861.57 |

FOREIGN PATENT DOCUMENTS

| JP | 02-038816 | 2/1990 |
| JP | 11-190644 | 7/1999 |
| JP | 2001-221666 | 8/2001 |

* cited by examiner

*Primary Examiner*—Harshad Patel
(74) *Attorney, Agent, or Firm*—Wenderoth, Lind & Ponack, L.L.P.

(57) ABSTRACT

A flowmeter can measure a small flow rate of fluid with high measurement precision, can be made small-sized, can deal with a variety of types of chemicals, and can be produced easily at a low cost. The flowmeter includes: a casing having an enlarged portion and being disposed vertically; and a float enclosed in the enlarged portion of the casing and at least partly having a detection surface. The float is to be pushed up by a fluid flowing from below into the casing and flowing upwardly in the casing. The flowmeter also includes at least one displacement sensor, disposed outside the enlarged portion of the casing, for detecting an axial displacement of the float by magnetizing the detection surface of the float.

14 Claims, 5 Drawing Sheets

FLOWMETER HAVING A FLOAT AND A DISPLACEMENT SENSOR

BACKGROUND OF THE INVENTION

1. Field of the Invention

The present invention relates to a flowmeter suited for measuring a small flow rate of fluid, and more particularly to a flowmeter suited for measuring a small flow rate of fluid in a semiconductor manufacturing apparatus for manufacturing, for example, a semiconductor device having a fine interconnect structure.

2. Description of the Related Art

For measuring the flow rate of a fluid, such as a gas or liquid, a flowmeter can be used which has a heating element disposed in a casing and measures the flow rate of a fluid by measuring the temperature of the heating element whose temperature changes with the flow rate of the fluid flowing in the casing.

A flowmeter is known which includes a plurality of light emitting diodes (LEDs) disposed on one side of a casing formed of an optically-transparent material, a plurality of light-receiving photodiodes disposed on the opposite side of the casing and facing the LEDs, and a float formed of a light-shielding material disposed in the casing. The flowmeter detects the position of the float by detecting the position of a light-receiving photodiode which has come to receive no light from an LED due to blocking of light by the float (see, for example, Japanese Patent laid-Open Publication No. H2-388162).

Another flowmeter is known which includes a float formed of a light-shielding material disposed in a casing formed of an optically-transparent material, and a plurality of imaging sensor units, each comprised of an optical lens and an image sensor, disposed along the casing to recognize an effective imaging range for the casing by a combination of the imaging ranges of the imaging sensor units. This flowmeter detects the position of the float based on electrical signal outputs from the imaging sensor units (see, for example, Japanese Patent Laid-Open Publication No. 2001-221666).

A similar flowmeter is known which uses lenses and CCD line sensors to project a one-dimensional image of a float on the line sensors and detects the position of the float from the position of the image (see, for example, Japanese Patent Laid-Open publication No. 2001-221666).

Further, another flowmeter is known which includes a float provided with a permanent magnet, a casing, and a plurality of magnetic sensors disposed outside the casing, and which detects the position of the float by detecting the magnetism of the permanent magnet of the float with one of the plurality of magnetic sensors (see, for example, Japanese Patent laid-open Publication No. H11-190644). In the conventional flowmeter using a heating element manufactured, for example, with a micromachine, the heating element is exposed to a fluid. When handling a corrosive fluid, it is therefore necessary to cover and protect the heating element with a protective material. In this case, because of the heat conductivity of the protective film, the measurement precision cannot be made high in measurement of a small flow rate of fluid. In addition, the response speed undesirably becomes slow, leading to difficult measurement of a small flow rate of fluid.

In the case of the conventional flowmeter having optical or magnetic sensors provided outside a casing for detecting the position of a float, the number of parts must be increased in order to enhance the measurement precision. This leads to difficult assembly, a larger-sized construction, and a higher cost. Further, a flowmeter having optical sensors needs the use of an optically-transparent casing, and therefore materials for the casing are restricted. In addition, such a flowmeter deals with some types of fluids with difficulty.

SUMMARY OF THE INVENTION

The present invention has been made in view of the above situation in the related art. It is therefore an object of the present invention to provide a highly-reliable flowmeter which can measure a small flow rate of fluid with high measurement precision, can be made small-sized, can deal with a variety of types of chemicals, and can be produced easily at a low cost.

In order to achieve the object, the present invention provides a flowmeter comprising: a casing having an enlarged portion and which is disposed vertically; and a float enclosed in the enlarged portion of the casing and at least partly having a detection surface. The float is to be pushed up by a fluid flowing from below into the casing and flowing upwardly in the casing. The flowmeter also comprises at least one displacement sensor disposed outside the enlarged portion of the casing for detecting an axial displacement of the float by magnetizing the detection surface of the float.

According to the flowmeter of the present invention, an upward flow of a fluid in the vertical casing exerts an upward pressing force on the float enclosed in the enlarged portion of the casing. The float, in the balance between the pressing force and its own weight, floats and stands still at a position corresponding to the flow rate of the fluid flowing in the flowmeter. Since the float at least partly has a magnetic detection surface, the axial floating position (displacement) of the float can be detected precisely with high resolution by a displacement sensor, such as an inductance-type displacement sensor or eddy current-type displacement sensor, disposed outside the enlarged portion of the casing.

A preferable example of the displacement sensor is a sensor of very small size, comprised of a ferrite magnetic core and a coil wound on it and having such a very high resolution that it can detect displacement of the order of about 1 μm. The use of this displacement sensor can afford a sufficiently high measurement precision even when the size of the flowmeter is made small such that the stroke (movable range in the vertical direction) of the float is e.g. about 2 mm. Furthermore, this replacement sensor has high impact resistance, is highly reliable, and can be produced at a low cost.

The present invention also provides a casing for a flowmeter, having an enlarged portion provided with at least one displacement sensor outside and disposed vertically so that a fluid is allowed to flow from below into the casing and flow upwardly in the casing.

The present invention also provides a float at least partly having a detection surface and enclosed in an enlarged portion of a casing. The float is to be pushed up in the enlarged portion by a fluid flowing from below into the casing and flowing upwardly in the casing.

The flowmeter of the present invention detects an axial displacement of the float with a displacement sensor, such as an inductance-type displacement sensor or an eddy current-type displacement sensor. This enables high-precision measurement of a small flow rate of fluid, downsizing of the flowmeter and low-cost production of the flowmeter. Further, the casing and the float of the flowmeter can be made of a metal material, so that a small flow rate of fluid can be measured stably with high precision even in a corrosive environment. In addition, the flowmeter can be produced not by fine processing technology using, for example, a micro-machine, but by ordinary technology. Accordingly, the flowmeter of solid construction can be produced at a low cost.

DETAILED DESCRIPTION OF THE PREFERRED EMBODIMENTS

Preferred embodiments of the present invention will now be described with reference to the drawings. In the drawings, members or elements having the same operation or function are designated with the same reference numeral and a duplicate description thereof is omitted.

Figure 1A:
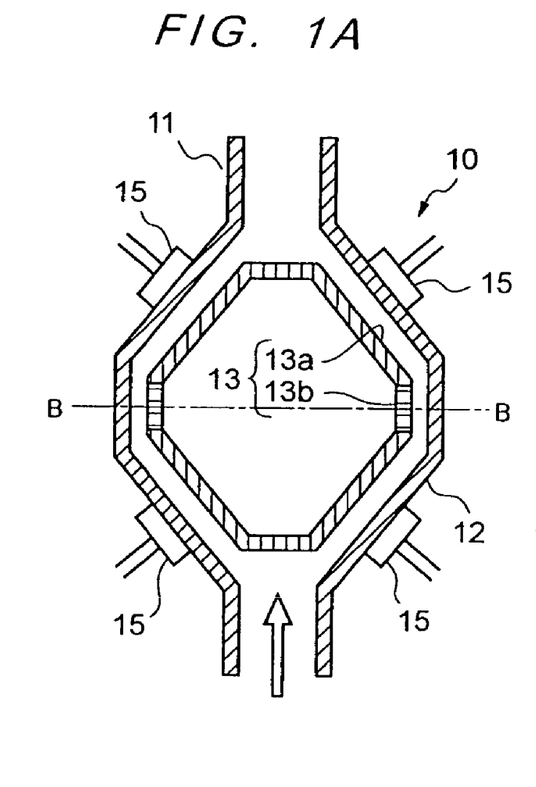
FIG. 1A is a vertical sectional view of a flowmeter according to a first embodiment of the present invention.
Figure 1B:
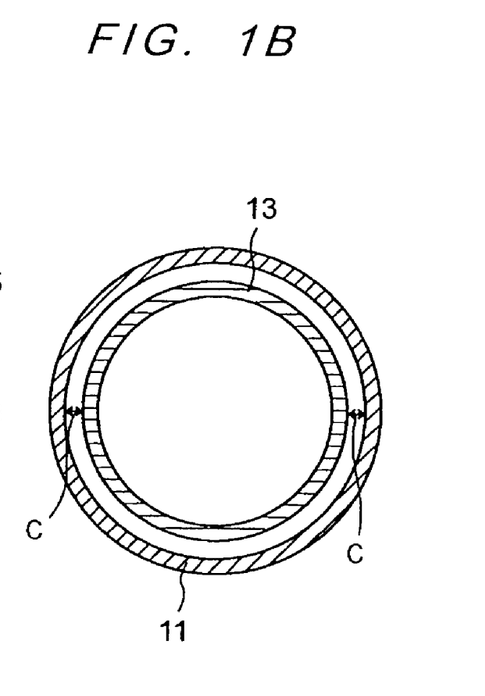
FIG. 1B is a cross-sectional view taken along line B-B of FIG. 1A.
Figure 1C:
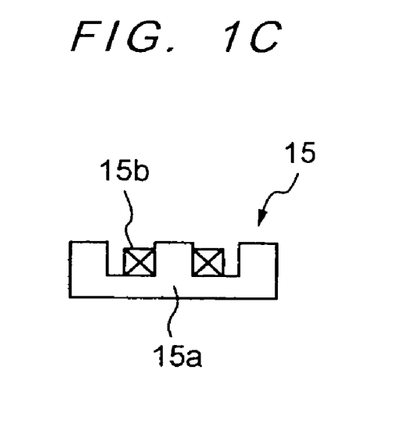
FIG. 1C is a vertical sectional view of a displacement sensor.
Figure 1D:
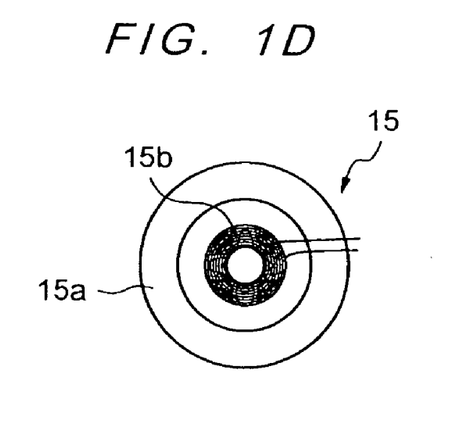
FIG. 1D is a plan view of the displacement sensor.

FIGS. 1A and 1B show a flowmeter 10 according to a first embodiment of the present invention, and FIGS. 1C and 1D show a displacement sensor 15 used in the flowmeter 10. The flowmeter 10 includes a casing 11 having an enlarged portion 12 and disposed vertically, and a float 13 enclosed in the enlarged portion 12. Inductance-type displacement sensors 15, for measuring an axial displacement of a float 13, are provided outside the enlarged portion 12 of the casing 11. The casing 11 is formed of, for example, a stainless steel, and the float 13 has a detection surface 13a of high-permeability magnetic material (permalloy). The displacement sensor 15 magnetizes the detection surface (magnetic surface) 13a through the casing 11, and measures an axial displacement of the detection surface (magnetic surface) 13a from a change in the inductance.

In particular, the float 13 has at its upper and lower ends truncated conical portions of permalloy, high-permeability magnetic material, with the respective surfaces serving as detection surfaces 13a. In addition, float 13 has a cylindrical portion 13b of non-magnetic aluminum material between the truncated conical portions. The diameter of the cylindrical portion 13b is, for example, about 20 mm and the height is, for example, about 30 mm. The specific gravity of the float 13 of this embodiment is set to about 2 so that it sinks in a stationary fluid (e.g. water) as a measuring object. The specific gravity of the float 13 can be set to an appropriated value, depending on the type of the fluid to be measured, the flow rate, etc., by adjusting the ratio between the heavy permalloy and the light aluminum, and the proportion of the hollow center portion of the float 13.

As shown in FIGS. 1C and 1D, the displacement sensor 15 is comprised of, for example, a ferrite core 15a and a coil 15b wound on the ferrite core 15a. The ends of the coil 15b are connected to a not-shown sensor amplifier and a sensor output is taken out. The size of the ferrite core 15a is very small, for example, no more than several mm in diameter and no more than 2 to 3 mm in height. Accordingly, the size of the flowmeter 10, i.e. the sum of the size of the enlarged portion 12 of the casing 11 and the size of the displacement sensor 15, can be nearly the same as the size of the enlarged portion 12 of the casing 11. Further, the inductance-type displacement sensor 15 can measure a displacement of the detection surface, the measuring object, with a resolution of the order of 1 μm in a contactless manner through the casing 11 of stainless steel.

In this embodiment, three inductance-type displacement sensors 15 on the upper end side of the enlarged section 12 and three inductance-type displacement sensors 15 on the lower end side are disposed at regular intervals in the circumferential direction. The respective three displacement sensors 15 are connected in series so that the total output can be taken out. Thus, the average output of the three displacement sensors 15 can be taken out to enhance the measurement precision. A circuit is designed so that a differential motion output is taken out from the total output of the upper end side sensors and the total output of the lower end side sensors. Thus, when the float 13 moves vertically (axially) in the enlarged portion 12, the axial displacement can be measured by taking a differential motion output between the upper sensors and the lower sensors.

Figure 2A:
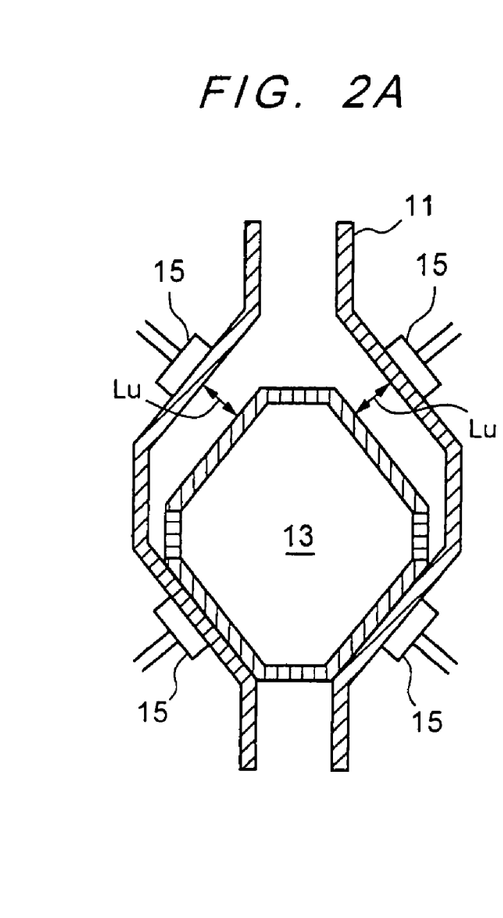
FIG. 2A is a cross-sectional diagram showing the state of a float in a casing when there is no flow of fluid in the casing.
Figure 2B:
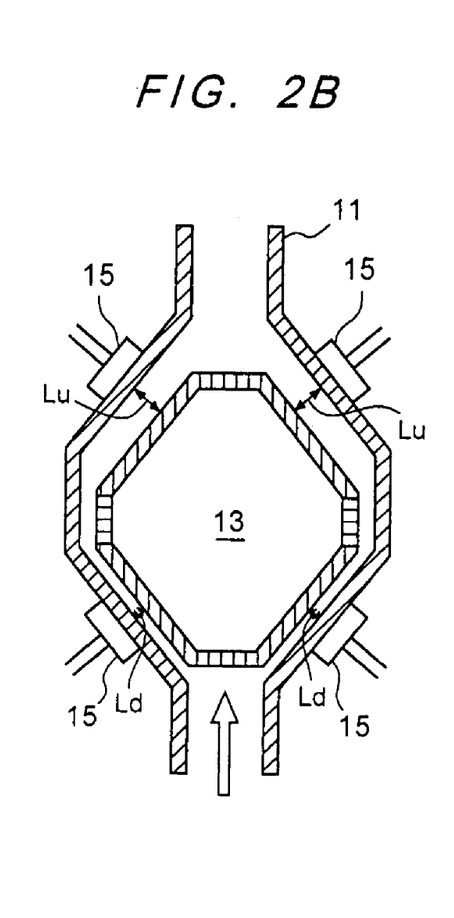
FIG. 2B is a cross-sectional diagram showing the state of the float when a fluid is flowing into the casing.
Figure 2C:
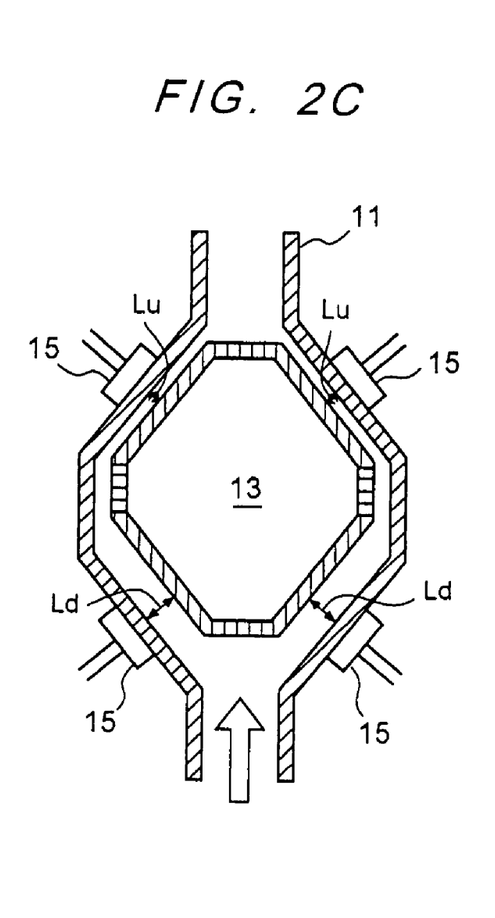
FIG. 2C is a cross-sectional diagram showing the state of the float when the flow rate of the fluid has increased.

FIGS. 2A through 2C illustrate the principle of flow rate measurement by the flowmeter 10. As shown in FIG. 2A, when there is no flow of fluid through the casing 11, the float 13, by its own weight, is in contact with the inner surface of the lower inverted truncated conical portion of the enlarged portion 12 of the casing 11. When a fluid begins flowing into the casing 11, the float 13 is pushed up by the flow of the fluid and stands still at a position where the upward pressing force of the flow of the fluid and the weight of the float 13 are balanced, as shown in FIG. 2B. As the flow rate of the fluid flowing in the casing 11 increases, the float 13 moves up and stands still at a higher position, as shown in FIG. 2C.

Thus, the floating position (axial displacement) of the float 13 changes approximately linearly with changes in the flow rate of the fluid flowing in the casing 11. Accordingly, the flow rate of the fluid flowing in the casing 11 can be determined by detecting the axial displacement of the float 13 with the displacement sensors 15. The displacement sensors 15 measure the distances Lu and Ld between the float 13 and the upper/lower truncated conical portions of the casing 11, shown in FIGS. 2A through 2C. The axial displacement component of the float 13 can be calculated from the distances Lu and Ld. In the flowmeter 10 of this embodiment, the float 13 has a diameter of 20 mmØ and a height of 30 mm and the stroke (movable distance in the axis direction) of the float 13 in the enlarged portion 12 is set to about 2 mm. The use of the displacement sensor 15 with a resolution of about 1 μm with respect to the displacement of the float 13 can measure an axial displacement of the float 13 with remarkably high precision.

In the flowmeter 10, the clearance "C" (see FIG. 1B) between the inner diameter of the enlarged portion 12 of the casing 11 and the outer diameter of the float 13 is set to about 0.2 mm. Such clearance corresponds to the cross-sectional area of the casing (flow passage) of about 5 mmØ, which makes it possible to measure with high precision such a small flow rate as about 10-60 cc/min in terms of water, as will be described later.

A measurable flow rate range to the measuring object can be changed by changing the clearance "C" between the inner diameter of the enlarged portion 12 of the casing 11 and the outer diameter of the float 13. For example, in a semiconductor manufacturing apparatus for manufacturing e.g. a semiconductor device having a fine interconnect structure, supply of a viscous fluid, such as a resist solution, is required to be controlled to a small flow rate, for example, about 10 cc/min. The requirement can be met and high-precision measurement of such a small flow rate becomes possible by providing a clearance corresponding to the cross-sectional area of the casing (flow passage) of e.g. about 2-3 mmØ.

Similarly, for a rough cleaning liquid, for example, control of the flow rate at about 2000-3000 cc/min is required. The requirement can be met and high-precision measurement of such a flow rate becomes possible by providing a clearance corresponding to the cross-sectional area of the casing (flow passage) of e.g. about 10 mmØ. Though the flowmeter of the present invention with a small clearance "C" is suitable for measurement of a small flow rate, the flowmeter, of course, can be used to measure a larger flow rate by making the clearance "C" larger.

In a semiconductor manufacturing apparatus, there are cases where various fluids, such as a fluorine-containing fluid, an acid, an alkali, a liquid chemical, a resist solution and a polishing slurry, are supplied under precise control of flow rate, for example, upon supply of a cleaning liquid to a cleaning apparatus, supply of a resist solution to a resist coating apparatus, and supply of a polishing slurry to a polishing apparatus. The flowmeter of the present invention can be advantageously used for flow rate measurement in such cases for the following reasons. Firstly, high-precision measurement of a small flow rate is possible. Secondly, the casing 11 and the float 13 can be made of a metal material, so that they can be highly stable to various chemicals. Thirdly, since a small-sized displacement sensor 15, which requires no high assembling precision, can be used, the flowmeter can be made small-sized and can be easily incorporated in a semiconductor manufacturing apparatus, etc. Fourthly, the flowmeter is highly reliable. Fifthly, since an electrical signal corresponding to a flow rate can be taken out (produced), the flowmeter can be easily incorporated in a control system.

Figure 3:
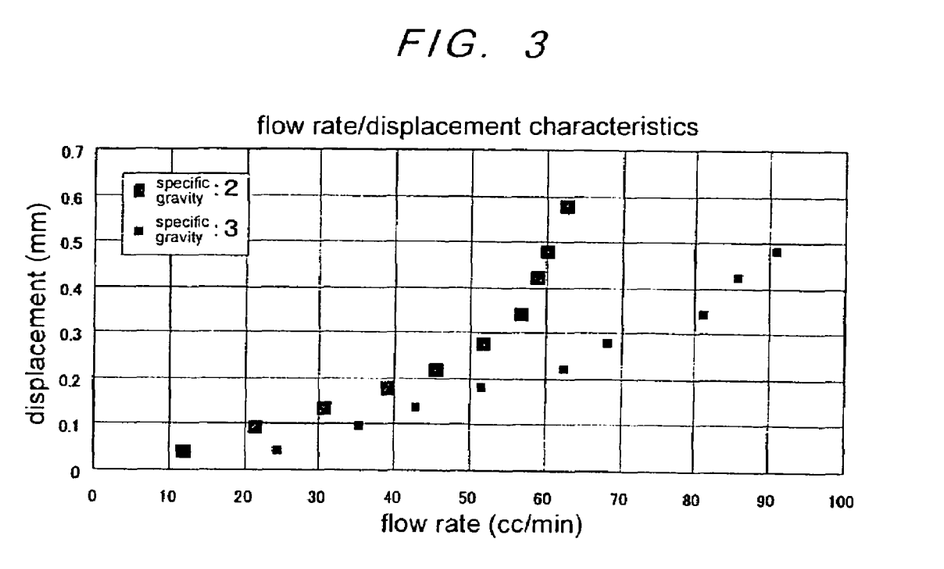
FIG. 3 is a graph showing the relationship between the flow rate of fluid and the axial displacement of the float as measured for floats having different specific gravities.

A description will now be made of actual measurement data on flow rate measuring characteristics of the flowmeter 10. FIG. 3 shows the relationships between the flow rate of a fluid flowing in the casing 11 and the axial displacements of the float 13 as measured for two different specific gravities of the float. The abscissa denotes the flow rate of fluid (water), and the ordinate denotes the axial displacement of the float 13. The data for the float 13 having a specific gravity of 2 is shown in comparison with the data for the float 13 having a specific gravity of 3. As apparent from FIG. 3, the displacement of the float 13 having a specific gravity of 3 is smaller than the displacement of the float 13 having a specific gravity of 2, and the range of flow rate, in which the flow rate can be measured from the displacement in an approximately linear relationship therebetween, broadens to 10-90 cc/min.

Though the axial displacement of the float 13 is as small as about 0-0.5 mm, the axial displacement of the float 13 can be measured with sufficiently high precision by using a displacement sensor 15 with a resolution of the order of about 1 μm.

A flowmeter according to another embodiment of the present invention will now be described with reference to FIGS. 4 through 6.

Figure 4:
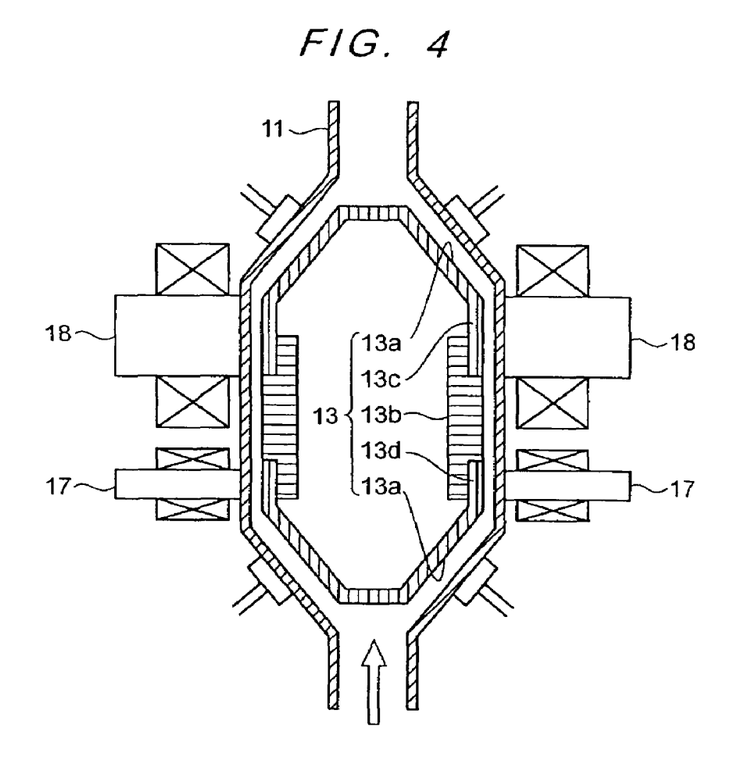
FIG. 4 is a vertical sectional view of a flowmeter according to a second embodiment of the present invention.

FIG. 4 shows a flowmeter according to a second embodiment of the present invention. This flowmeter includes, in addition to the construction of the above-described flowmeter of the first embodiment, a radial magnetic bearing for controlling the radial position of the float 13. In particular, the flowmeter of this embodiment includes radial displacement sensors 17 for detecting the radial position of the float 13, a not-shown control device for controlling the position of the float 13 to maintain float 13 at a target radial position based on the position detected by the displacement sensors 17, and electromagnets 18. When the float 13 is radially displaced from the center of the casing 11, (which is the target position), the displacement sensors 17 detect the eccentric displacement of the float 13 and the control device exerts a radial magnetic force on the float 13 by the electromagnets 18, thereby returning the float 13 to the center of the casing 11 (i.e., the target position).

Four displacement sensors 17 and four electromagnets 18 are disposed respectively at regular intervals about float 13 in the circumferential direction, so that detection of displacement of the float 13 in the X, Y directions and control of the position of the float 13 can be conducted. The float 13 includes a cylindrical portion 13c of magnetic material, serving as a target of the electromagnets 18, below the upper truncated conical detection surface 13a, and a cylindrical portion 13d of magnetic material, serving as a target of the displacement sensors 17, above the lower truncated conical detection surface 13a.

Instead of using the radial displacement sensors 17, it is also possible to use a sensorless radial magnetic bearing which comprises the electromagnets 18 which, by utilizing the winding, are provided with a displacement sensor function of detecting a radial displacement of the float 13.

The flowmeter of this embodiment, whose construction is the same as the flowmeter of the first embodiment except for the provision of the radial magnetic bearing, has the same high-precision detection characteristics for small flow rates as the flowmeter of the first embodiment. In addition to this, with the provision of the radial magnetic bearing, it becomes possible with the flowmeter of this embodiment to always hold the float 13 in the center of the enlarged portion 12 of the casing 11. This can prevent the float 13 from contacting the inner wall surface of the casing 11, thereby preventing contamination due to contact between the float 13 and the casing 11.

Furthermore, the electromagnets 18 of the radial magnetic bearing constantly exert a radial electromagnetic force on the float 13. The radial magnetic force generates an axial shear force in the float 13. Specifically, when the float 13 moves in the axial direction, the radial shear force counteracts the axial movement of the float 13. Thus, the axial electromagnetic force, constantly applied from the electromagnets 18 on the float 13, produces the same effect as produced by an increase in the specific gravity of the float 13. Accordingly, it becomes possible to broaden the flow rate measurement range from 10-60 cc/min to e.g. 10-600 cc/min by adjusting the constant magnetic force of the electromagnets 18.

Though in this embodiment an axial displacement of the float 13 due to a change in the flow rate of a fluid flowing in the casing 11 is detected with the displacement sensors 15, it is also possible to detect a change in the flow rate of a fluid flowing in the casing 11 from a change in the electric current of the electromagnets 18 by utilizing the above-described magnetic shear force generated by the electromagnets 18.

In particular, a minimum electric current is supplied to the electromagnets 18 when the flow rate of a fluid flowing in the casing 11 is zero. By using the magnetic shear force of the electromagnets 18, the float 13 is held in a certain axial position detected with the displacement sensors 15. When the flow rate of the fluid flowing in the casing 11 has increased, the upward pressing force applied from the fluid on the float 13 increases. At that moment, the electric current supplied to the electromagnets 18 is increased to increase the magnetic shear force in order to hold the float 13 in the certain axial position. In carrying out such control of the axial position of the float 13, the larger the flow rate of the fluid flowing in the casing 11 is, the larger the magnetic shear force and thus the higher the electric current supplied to the electromagnets 18 that are needed to hold the float 13 in the certain axial position. Thus, there is a correlation between the flow rate of the fluid flowing in the casing 11 and the electric current supplied to the electromagnets 18, and the correlation makes it possible to measure the flow rate of the fluid flowing in the casing 11 from the electric current supplied to the electromagnets 18.

Figure 5:
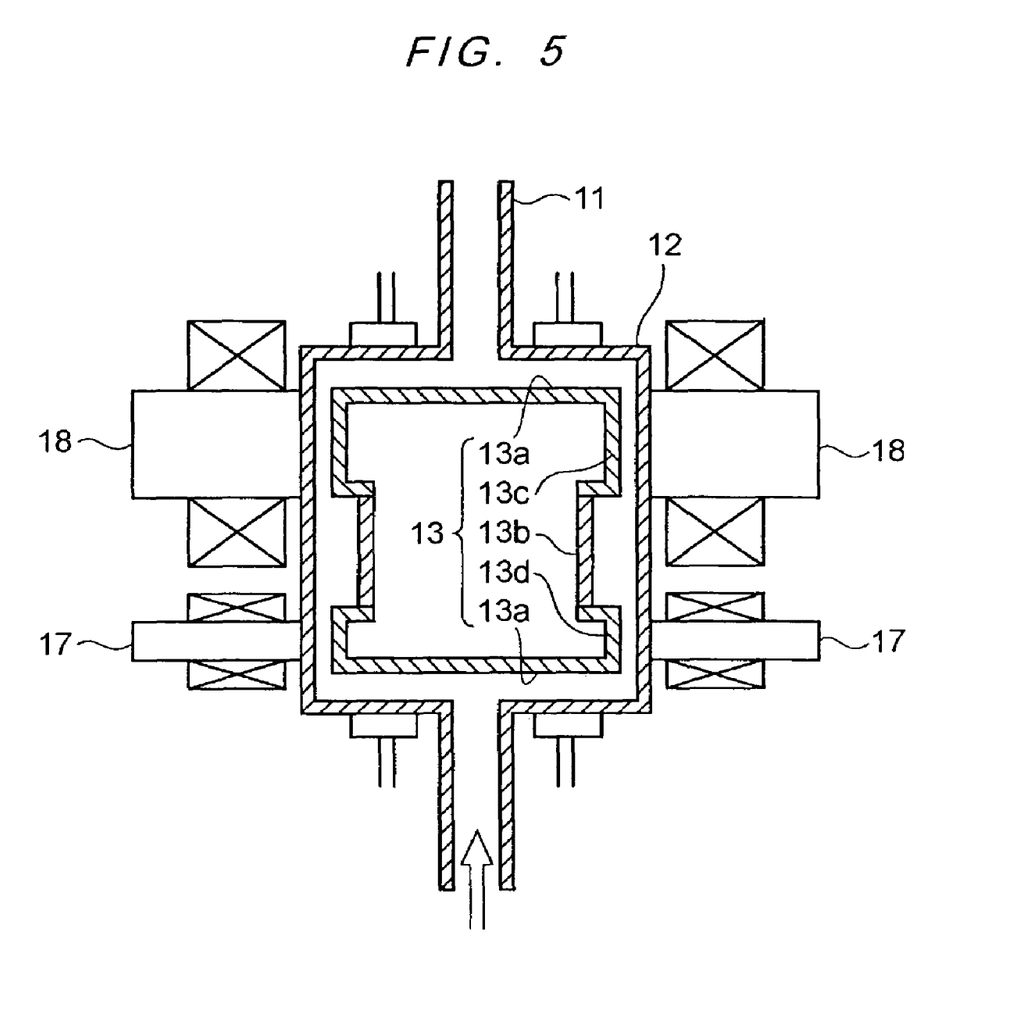
FIG. 5 is a vertical sectional view of a flowmeter according to a third embodiment of the present invention.
Figure 6:
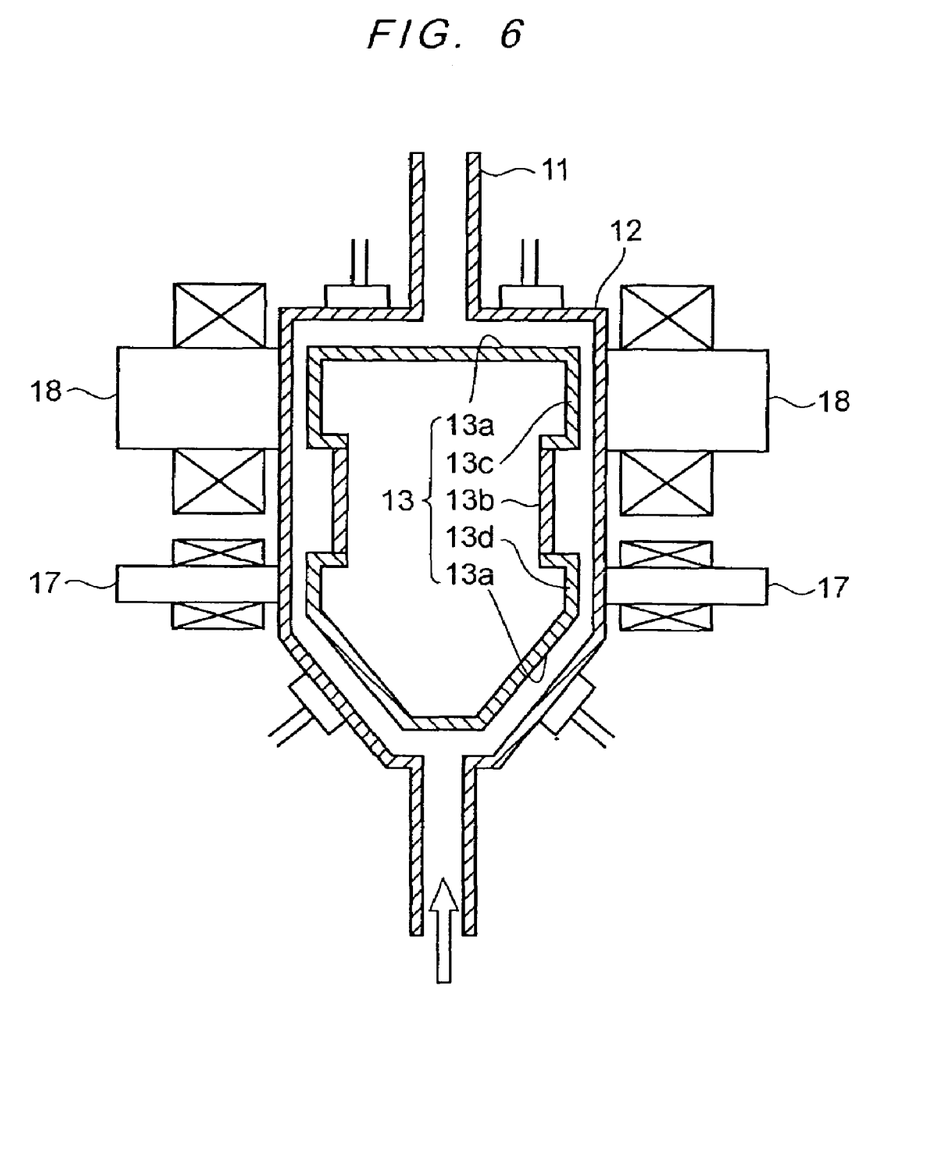
FIG. 6 is a vertical sectional view of a variation of the flowmeter according to the third embodiment shown in FIG. 5.

FIG. 5 shows a flowmeter according to a third embodiment of the present invention. The flowmeter of this embodiment differs from the flowmeter of the second embodiment in that the truncated conical portions at the upper and lower ends of the float 13 are eliminated and the detection surfaces 13a at the upper and lower ends of the float 13 are made flat surfaces (circular surfaces). Consequently, the enlarged portion 12 of the casing 11 is made rectangular (in crosssection), and the displacement sensors 15 are set on the surfaces perpendicular to the axial (longitudinal) direction of the enlarged section 12. The remaining construction is the same as the flowmeters of the first and second embodiments.

With such distinctive features of this embodiment, the flowmeter can be made smaller-sized. It is, of course, possible to eliminate the radial displacement sensors 17 and the electromagnets 18, together constituting the radial magnetic bearing. Even such flowmeter without a radial magnetic bearing has the same flow rate detection characteristics as the flowmeter of the first embodiment and can detect with sufficiently high precision a small flow rate even in a corrosive environment.

However, the truncated conical portions at the upper and lower ends of the float 13 of the flowmeter according to the first or second embodiment, together with the inverted truncated conical surfaces, facing the detection surfaces 13a, of the enlarged portion 12 of the casing 11, allows a fluid to flow smoothly and stably into the enlarged portion 12 of the casing 11. In view of this, it is possible to leave the truncated conical portion at the lower end of the float 13 and the inversed truncated conical surface, facing the lower detection surface 13a, of the enlarged portion 12 of the casing 11, as shown by the variation in FIG. 6. This allows a fluid to flow smoothly and stably into the enlarged portion 12 of the casing 11. In addition, the modifications to the flat detection surface 13a at the upper end of the float 13 and to the flat surface, facing the flat detection surface 13a and perpendicular to the axial direction, of the enlarged portion 12 of the casing 11, can contribute to downsizing of the flowmeter.

It is, of course, possible also with this flowmeter to eliminate the radial displacement sensors 17 and the electromagnets 18, together constituting the radial magnetic bearing. Even such flowmeter without a radial magnetic bearing has the same flow rate detection characteristics as the flowmeter of the first embodiment and can detect with sufficiently high precision a small flow rate even in a corrosive environment.

Though in the above-described first to third embodiments an inductance-type displacement sensor is used as the displacement sensor 15 to detect a displacement of the detection surfaces 13a of the permalloy float 13 from outside the casing 11 of non-magnetic steel, it is also possible to use an eddy current-type displacement sensor as the displacement sensor 15. In this case, the presence of a steel casing 11, which has a high electric conductivity, between the sensor 15 and the detection surface 13a incurs a considerable loss of eddy current. It is therefore preferred to use a different material for the casing. For example, a ceramic or resin material is preferably used for the casing in front of the eddy current-type displacement sensor so as to reduce eddy current loss. An eddy current-type sensor detects a displacement of an object based on a change in the impedance with a change in eddy current due to the displacement of the object. Accordingly, it is not necessary to use a highpermeability magnetic material for the detection surfaces 13a of the float 13. A conductive material, which can generate an eddy current, will suffice.

In the case of detecting the position of a float through a metal casing by using an eddy current-type displacement sensor, the S/N ratio of a displacement sensor signal is low due to the influence of eddy current loss, etc caused by the casing. In order to reduce the influence and improve the S/N ratio, it is preferable to make the sensor driving current power-driven and provide a filter section for adequately removing noise from a sensor signal. Furthermore, in order to compensate phase shifting of sensor signal caused e.g. by a filter, it is preferable to provide a phase compensation section in a sensor signal section, a reference signal section and a synchronous detection signal section and optimize the sensor sensitivity.

Though the casing 11 and the float 13, both made of a metal material, are used in the above-described embodiments, some liquid chemical as a measuring object can cause corrosion in a metal material. It is preferred in that case to use for the casing 11a resin or ceramic material having resistance to the chemical. Further, the float 13 is preferably coated and protected with a resin material having resistance to the chemical.

While the present invention has been described with reference to the preferred embodiments thereof, it will be appreciated by those skilled in the art that the present invention is not limited to the embodiments, but changes and modifications can be made therein within the spirit and scope of the present invention.

What is claimed is:

1. A flowmeter comprising:
   a casing having an enlarged portion, said casing being disposed vertically;
   a float enclosed in said enlarged portion of said casing and having a detection surface, said float being shaped and arranged to be pushed upwardly by a fluid flowing upwardly through said casing;
   an axial displacement sensor located outside said enlarged portion of said casing, said axial displacement sensor being operable to detect an axial displacement of said float by magnetizing said detection surface of said float; and
   a radial electromagnetic bearing located outside said enlarged portion of said casing, said radial electromagnetic bearing being operable to control a radial position of said float, said radial electromagnetic bearing including electromagnets and radial displacement sensors operable to detect a radial position of said float.

2. The flowmeter of claim 1, wherein said axial displacement sensor is an inductance axial displacement sensor or an eddy current axial displacement sensor.

3. The flowmeter of claim 1, wherein said float has a first end portion and a second end portion, each of said first end portion and said second end portion having a truncated conical detection surface and a central cylindrical portion.

4. The flowmeter of claim 1, wherein said float has a first end portion and a second end portion, each of said first end portion and said second end portion having a circular detection surface and a central cylindrical portion.

5. The flowmeter of claim 1, wherein said float has an adjustable specific gravity so as to allow adjustment of a measurable flow rate range.

6. The flowmeter of claim 1, wherein said electromagnets of said radial electromagnetic bearing are operable to hold said float in a certain position, said flowmeter being operable to measure a flow rate of the fluid flowing through the casing based on an electric current of said electromagnets necessary to maintain said float in the certain position against the flow of the fluid.

7. A semiconductor manufacturing apparatus including said flowmeter of claim 6.

8. A semiconductor manufacturing apparatus including said flowmeter of claim 1.

9. The flowmeter of claim 1, wherein said radial displacement sensors of said radial electromagnetic bearing comprise four displacement sensors spaced evenly around a circumference of said casing, and said electromagnets comprising four electromagnets spaced evenly around said circumference of said casing.

10. The flowmeter of claim 1, wherein said casing is shaped such that said axial displacement sensor is set on a surface of said casing perpendicular to an axial direction of said enlarged section of said casing.

11. The flowmeter of claim 10, wherein said float has an end portion with a surface substantially parallel to said surface of said casing on which said axial displacement sensor is set.

12. The flowmeter of claim 1, wherein said lower end of said float has a truncated conical detection surface.

13. The flowmeter of claim 12, wherein said lower end of said enlarged portion of said casing has a truncated conical shape corresponding to a shape of said lower end of said float.

14. The flowmeter of claim 1, wherein said casing is made of a ceramic material or a resin material, said axial displacement sensor comprises an eddy current sensor, and said detection surface of said float is made of a conductive material.

* * * * *